(12) United States Patent
Rousseau et al.

(10) Patent No.: US 10,126,568 B2
(45) Date of Patent: Nov. 13, 2018

(54) MULTIFOCAL OPHTHALMIC SPECTACLE LENS ARRANGED TO OUTPUT A SUPPLEMENTARY IMAGE

(71) Applicant: Essilor International, Charenton le Pont (FR)

(72) Inventors: Benjamin Rousseau, Charenton le Pont (FR); Sébastien Fricker, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 0 days.

(21) Appl. No.: 15/128,748

(22) PCT Filed: Mar. 27, 2015

(86) PCT No.: PCT/EP2015/056751
§ 371 (c)(1),
(2) Date: Sep. 23, 2016

(87) PCT Pub. No.: WO2015/150269
PCT Pub. Date: Oct. 8, 2015

(65) Prior Publication Data
US 2017/0351117 A1    Dec. 7, 2017

(30) Foreign Application Priority Data

Apr. 1, 2014    (EP) .................... 14290091

(51) Int. Cl.
*G02C 7/00*    (2006.01)
*G02C 7/02*    (2006.01)
(Continued)

(52) U.S. Cl.
CPC ............ *G02C 7/068* (2013.01); *G02B 6/0011* (2013.01); *G02B 27/0172* (2013.01);
(Continued)

(58) Field of Classification Search
CPC ............. G02B 6/0011; G02B 27/0172; G02B 2027/0178; G02C 7/068; G02C 7/027; G02C 7/028
(Continued)

(56) References Cited

U.S. PATENT DOCUMENTS 8,057,033 B2    11/2011    Moliton et al.
2008/0273246 A1    11/2008    Moliton et al.
(Continued)

FOREIGN PATENT DOCUMENTS

EP    2 492 740    8/2012
WO    WO 01/25837    4/2001
(Continued)

OTHER PUBLICATIONS

P. Allione, F. Ahsbahs and G. Le Saux, "Application of Optimization in Computer-Aided Ophthalmic lens design", in SPIE vol. 3737, EUROPTO Conference on Design and Engineering of Optical Systems, Berlin, May 1999).

*Primary Examiner* — Tuyen Tra
(74) *Attorney, Agent, or Firm* — Oblon, McClelland, Maier & Neustadt, L.L.P.

(57) ABSTRACT

A multifocal ophthalmic spectacle lens (10) capable of correcting a wearer's ophthalmic vision and having a back surface (BS) and a front surface (FS), said lens comprising a light guide optical element arranged to output a supplementary image (SI) to the wearer through an exit surface (ES) of said light guide optical element, where the exit surface (ES), the back surface (BS) and an optical material located between said exit surface (ES) and said back surface (BS) form an optical device (OD) and wherein said optical device (OD) comprises an area of stabilized optical power.

13 Claims, 4 Drawing Sheets

(51) Int. Cl.
*G02C 7/06* (2006.01)
*F21V 8/00* (2006.01)
*G02B 27/01* (2006.01)

(52) U.S. Cl.
CPC ............ *G02C 7/027* (2013.01); *G02C 7/028* (2013.01); *G02B 2027/0178* (2013.01)

(58) Field of Classification Search
USPC ................... 351/41, 159.01, 159.41, 159.42
See application file for complete search history.

(56) References Cited

U.S. PATENT DOCUMENTS

2012/0057122 A1 3/2012 Guillot
2014/0354944 A1* 12/2014 Guillot .................. G02C 7/028
351/159.42

FOREIGN PATENT DOCUMENTS

| | | |
|---|---|---|
| WO | WO 2001/95027 | 12/2001 |
| WO | WO 2005/024491 | 3/2005 |
| WO | WO 2007/017766 | 2/2007 |
| WO | WO 2008/090000 | 7/2008 |

* cited by examiner

PPO

FIG. 4a

ASR

MULTIFOCAL OPHTHALMIC SPECTACLE LENS ARRANGED TO OUTPUT A SUPPLEMENTARY IMAGE

RELATED APPLICATIONS

This is a U.S. national stage application under 35 USC § 371 of International application No. PCT/EP2015/056751 filed on Mar. 27, 2015. This application claims the priority of European application no. 14290091.9 filed Apr. 1, 2014, the entire content of which is hereby incorporated by reference.

FIELD OF THE INVENTION

The invention relates generally to the field of multifocal ophthalmic spectacle lenses. More specifically, it relates to a multifocal ophthalmic spectacle lens capable of correcting wearer's ophthalmic vision and comprising a light guide optical element arranged to output a supplementary image to the wearer.

BACKGROUND OF THE INVENTION

Ophthalmic spectacle lenses providing an ophthalmic vision and a supplementary vision are known in the prior art. Said ophthalmic spectacle lenses have a front face and a back face and comprise a light-guide optical element. Said light-guide optical element is a device designed to transport light from a light source (for example light beam generator system) to the wearer's eye to enable information content to be viewed with minimal loss of information. According to an embodiment, light beams are reflected a plurality of times between two "reflection" faces between being introduced into the spectacle lens and exiting therefrom, said two reflection faces being faces of the light-guide optical element.

SUMMARY OF THE INVENTION

One object of the invention is to provide a multifocal ophthalmic spectacle lens providing both a suitable ophthalmic vision and a suitable supplementary vision so that the viewer sees both images clearly.

For this purpose, an aspect of the invention is directed to a multifocal ophthalmic lens capable of correcting a wearer's ophthalmic vision and having a back surface and a front surface, where the back surface is positioned closest to a wearer's eye when the multifocal ophthalmic lens is worn, the multifocal ophthalmic lens comprising a light guide optical element arranged to output a supplementary image to the wearer through an exit surface of said light guide optical element, where the exit surface, the back surface and an optical material located between said exit surface and said back surface form an optical device and wherein said optical device comprises an area of stabilized optical power, and wherein the exit surface is defined by an angular aperture contour, denoted $AC(\alpha,\beta)$, $\alpha$ being the eye declination angle and $\beta$ being the eye azimuth angle, wherein the angular aperture contour, $AC(\alpha,\beta)$, is situated in the area of stabilized optical power so that the optical device fulfils the requirement of following equation (E1) when $(\alpha,\beta)$ is within the contour $AC(\alpha,\beta)$:

$$-0.5 \text{ Diopter} \leq P(\alpha,\beta) - P_{mean} \leq 0.5 \text{ Diopter}; \quad (E1)$$

where $P(\alpha,\beta)$ is the dioptric power of the optical device and $P_{mean}$ is the mean dioptric power of the optical device within the contour $AC(\alpha,\beta)$, wherein $P(\alpha,\beta)$ and $P_{mean}$ are expressed in Diopter.

In the context of the present invention, the expression "area of stabilized optical power" refers to an area where the wearer can see clearly in all gaze directions without changing its accommodation. An area of stabilized optical power is an area where the requirements of the following equation are fulfilled:

$$-0.5 \text{ Diopter} \leq P(\alpha,\beta) - P_{mean} \leq 0.5 \text{ Diopter};$$

Thanks to a multifocal ophthalmic lens according to the present invention, a wearer can comfortably see a scene and/or look to a supplementary image.

In the context of the present invention, the expression "ophthalmic vision" means the visible perception of a scene such that this scene appears to him in front of him. Image of the scene originates directly from the wearer's environment when viewing said scene. The global information which is contained in the scene is thus perceived even though the image of the scene is deformed to provide a corrected image according to wearer's prescription.

Unlike the ophthalmic vision, a supplementary vision may provide the subject with information that does not originate directly from his environment. It may be data presented to the subject. For example, navigation data which are projected overlaid on the visor of an airplane pilot's headset constitute a supplementary vision, of the informative vision type. A supplementary vision of another type may supply modified images of certain parts of the subject's environment. Thus, other examples of supplementary vision are the provision of an infrared image which is converted into visible light, or an image of a part of the subject's environment which is enlarged.

A spectacle lens to which the invention is applied is designed to present such supplementary images in the field of vision of the wearer, or in a part of this field, while retaining the ophthalmic vision. In other words, the two visions, ophthalmic and supplementary, are available to the wearer. They may be available simultaneously or alternately. In the case of an informative supplementary vision, the supplementary image corresponds to the visual presentation of information data. These data may appear overlaid on the ophthalmic image, notably with a light intensity which is greater or with a color which is distinct. The ophthalmic image may remain visible or not while the data of the informative supplementary vision are presented to the wearer.

In the context of the present invention, the expression "optical device" is a subpart of an ophthalmic spectacle lens. An optical device is defined by two surfaces and by the optical material located between said surfaces, namely by its refractive index.

"Multifocal lens" are designed to provide two or more portions of different focal powers; the focal power change may be discontinuous or may be continuous over a part or over the whole of the lens.

Among multifocal lenses, one can find bifocal lenses, trifocal lenses, and progressive-addition lenses.

A bifocal lens is a multifocal lens having two portions, usually for far and near vision; the focal power change is then discontinuous.

A trifocal lens is a multifocal lens having three portions, usually for far, intermediate and near vision; the focal power changes are then discontinuous.

A progressive-power lens or progressive-addition lens is a lens with a positive dioptric add power.

By "progressive addition surface" is meant a continuous, aspheric surface having at least two distance vision zones and a zone connecting said two distance vision zones, where the dioptric power in the connecting zone increases between the farthest distance vision zone (remote vision zone) and the nearest distance vision zone (closer vision zone).

By "regressive surface" is meant a continuous, aspheric surface having at least two distance vision zones and a zone connecting said two distance vision zones, where the dioptric power in the connecting zone decreases between the farthest distance vision zone and the nearest distance vision zone.

By "distance vision zone" is meant a zone of the multifocal lens where the viewer has a comfortable vision for a given distance; distance vision zones are usually chosen within the list consisting of far vision zone (far viewing distance, namely viewing distance of more than four meters), intermediate vision zone (medium distance such as computer viewing distance, namely viewing distance of about 60 cm to four meters), near vision zone (reading distance, namely viewing distance of less than 60 cm).

By "dioptric add power" is meant the amount of dioptric power difference between two distance vision zones where said difference is calculated between the dioptric power of the nearest distance vision zone and the dioptric power of the farthest distance vision zone.

According to different embodiments of the present invention, that may be combined according to all technically valuable embodiments:

the $\alpha$ variation range within AC($\alpha,\beta$) and the $\beta$ variation range within AC($\alpha,\beta$) are each equal or greater to 5° (degree); according to an embodiment of preceding feature, the $\alpha$ variation range within AC($\alpha,\beta$) and/or the $\beta$ variation range within AC($\alpha,\beta$) is (are) equal or greater to 15°; according to a further embodiment, the $\alpha$ variation range within AC($\alpha,\beta$) and/or the $\beta$ variation range within AC($\alpha,\beta$) is (are) equal or greater to 30°;

the optical device is located in an area of stabilized astigmatism; in the context of the present invention, the expression "area of stabilized astigmatism" refers to an area where the norm of the astigmatism of the optical device is relatively uniform. According to an embodiment, an area of stabilized astigmatism is a zone where the requirements of following equation are fulfilled:

$$-0.5\ \text{Diopter} \leq \text{Asti}(\alpha,\beta) - \text{Asti}_{mean} \leq 0.5\ \text{Diopter};$$

Asti($\alpha,\beta$) being the norm of the astigmatism in the $\alpha,\beta$ gaze direction and $\text{Asti}_{mean}$ being the mean of the astigmatism norm over said area, wherein Asti($\alpha,\beta$) and $\text{Asti}_{mean}$ are expressed in Diopter;

the exit surface is defined by an angular aperture contour, denoted AC($\alpha,\beta$), $\alpha$ being the eye declination angle and $\beta$ being the eye azimuth angle, wherein the angular aperture contour, AC($\alpha,\beta$), is situated in the area of stabilized astigmatism so that the optical device fulfils the requirement of following equation (E2) when ($\alpha,\beta$) is within the contour AC($\alpha,\beta$):

$$0\ \text{Diopter} \leq \text{UnAsti}(\alpha,\beta) \leq 0.5\ \text{Diopter}; \qquad (E2)$$

where UnAsti($\alpha,\beta$) is the norm of the unwanted astigmatism of the optical device and wherein UnAsti is expressed in Diopter;

the area of stabilized optical power results from the optical power generated by the geometry of the back surface (BS).

According to the present invention, the unwanted astigmatism, UnAsti($\alpha,\beta$), is the astigmatism vectorial difference between the astigmatism suitable for correcting the wearer's ophthalmic vision, i.e. the astigmatism of the wearer's prescription, and the actual astigmatism of the optical device. The term 'unwanted astigmatism' is used to denote the data pair formed by an amplitude value and a value of angle. Although this is an abuse of language, it is also sometimes used to denote the amplitude of the unwanted astigmatism only.

According to an embodiment of the present invention, the multifocal ophthalmic lens is a progressive addition lens chosen within the list consisting of a lens comprising a far vision zone, an intermediate vision zone and a near vision zone; a lens comprising an intermediate vision zone and a near vision zone; a lens comprising a far vision zone and an intermediate vision zone.

Progressive addition ophthalmic lenses are now well known. Such lenses are used to compensate for presbyopia and allow the spectacle wearer to see objects over a wide range of distances, without having to remove his or her glasses. Progressive addition lenses typically, but not limited to, have a remote vision region, located in the top of the lens, a closer vision region located in the bottom of the lens.

According to the wearer's needs, a progressive addition ophthalmic lens encompasses different embodiments such as followings:

the remote vision is the far vision and the closer vision is the near vision;

the remote vision is the intermediate vision and the closer vision is the near vision;

the remote vision is the far vision and the closer vision is the intermediate vision.

A prescription for a given presbyopic wearer comprises a prescribed power value for remote vision and a prescribed power addition representative of the power increment needed between remote vision and closer vision. The power addition is termed the "prescribed addition".

One usually considers that a wearer is presbyopic when the prescribed addition is more than 0.5 Diopter, preferably equal or greater than 0.75 Diopter.

Accordingly a person skilled in the art would consider that an ophthalmic lens is a progressive addition lens only if the power variation observed on the lens is at least 0.5 Diopter, and preferably equal or greater than 0.75 Diopter.

According to preceding embodiment, the present invention may be directed to following additional but alternative features:

the multifocal ophthalmic lens is a progressive addition lens comprising a far vision zone, an intermediate vision zone and a near vision zone or a lens comprising a far vision zone and an intermediate vision zone, where the back surface is a progressive surface or a regressive surface and where the angular aperture contour, AC($\alpha,\beta$), is located in the far vision zone;

the multifocal ophthalmic lens is a progressive addition lens comprising a far vision zone, an intermediate vision zone and a near vision zone or a lens comprising an intermediate vision zone and a near vision zone, where the back surface is a progressive surface or a regressive surface, and where the angular aperture contour, AC($\alpha,\beta$), is located in the near vision zone;

the back surface is a progressive surface or a regressive surface, and where the angular aperture contour, AC($\alpha,\beta$), is located in the temporal zone or in the nasal zone of the lens, in a zone where a meets the intermediate vision zone;

the front surface is a progressive surface and the back surface is a surface where the absolute values of the mean sphere value differences over said surface are equal or less to 0.5 Diopter;

the back surface is a progressive surface or a regressive surface, and where the angular aperture contour, AC(α, β), is located in a part of the intermediate vision zone where the absolute value of the mean sphere value differences over said part of the intermediate vision zone are equal or less to 0.5 Diopter;

the back surface is a progressive surface comprising a surface discontinuity located around the angular aperture contour, AC(α,β).

According to an embodiment of the present invention, the multifocal ophthalmic lens is chosen within the list consisting of bifocal lens and trifocal lens.

According to preceding embodiment the bifocal lens is a lens chosen within the list consisting of a lens comprising an intermediate vision zone and a near vision zone; a lens comprising a far vision zone and an intermediate vision zone; a lens comprising a far vision zone and a near vision zone.

According an embodiment, the trifocal lens is a lens comprising a far vision zone, an intermediate vision zone and a near vision zone.

Another aspect of the present invention is directed to a method for calculating with computer means a multifocal ophthalmic lens capable of correcting wearer's ophthalmic vision and having a back surface and a front surface, where the back surface is positioned closest to a wearer's eye when the multifocal ophthalmic lens is worn, the multifocal ophthalmic lens comprising a light guide optical element arranged to output a supplementary image to the wearer through an exit surface of said light-conducting element, where the exit surface, the back surface and an optical material located between said exit surface and said back surface form an optical device so that said optical device is located in an area of stabilized optical power.

According to an embodiment, the geometry of the back surface and the geometry of the front surface are calculated thanks to an optimization method involving a target lens that has a virtual optical function according to a wearer's prescription.

All embodiments previously recited and directed to multifocal ophthalmic lenses according to the present invention can be calculated thanks to preceding method for calculating.

The calculation step can be performed by using a ray-tracing method or optimization algorithms. These methods are known by the one skilled in the art, for example in the publication "Application of optimization in computer-aided ophthalmic lens design" (P. Allione, F. Ahsbahs and G. Le Saux, in SPIE Vol. 3737, EUROPTO Conference on Design and Engineering of Optical Systems, Berlin, May 1999), which is incorporated by reference in the present document.

Calculating the optical system of a lens with a given front face is also known from the man skilled in the art and an example of an accurate method is disclosed in patent document WO 2007/017766.

In the context of the present invention, the expression "wearer's prescription" means a set of optical characteristics of optical power, of astigmatism and, where relevant, of addition, determined by an ophthalmologist or an eye care practitioner (ECR) in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription data for a progressive spectacle lens comprise values of optical power and of astigmatism at the distance-vision point and a dioptric add power.

BRIEF DESCRIPTION OF THE DRAWINGS

Examples will now be described with reference to the accompanying drawings wherein.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

Figure 1A:
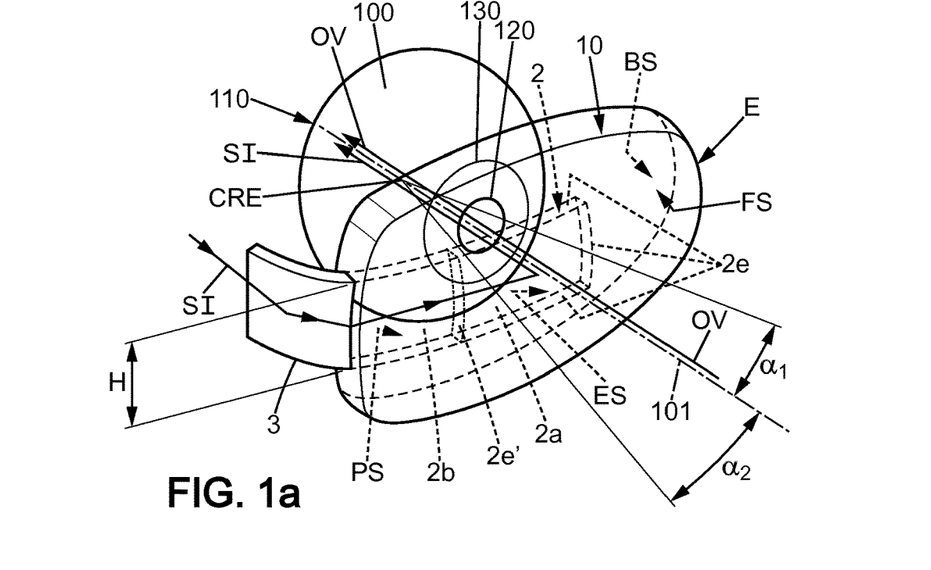
FIGS. 1a and 1b are sketches of an eye of a wearer and of an ophthalmic spectacle lens capable of correcting the wearer's ophthalmic vision and comprising a light guide optical element arranged to output a supplementary image.
Figure 1B:
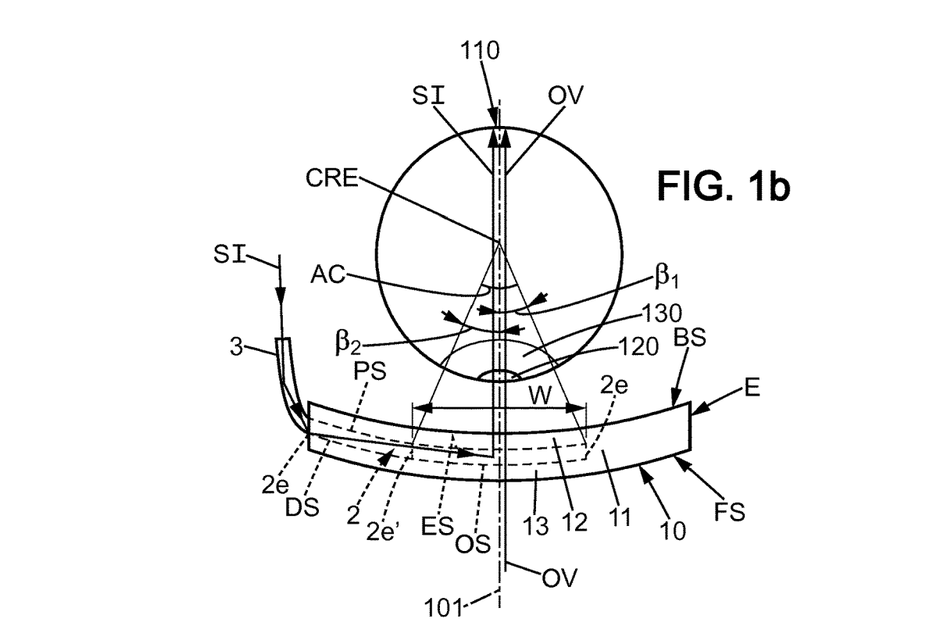

FIGS. 1a and 1b are sketches that illustrate the principle of a spectacle lens 10 which provides both an ophthalmic vision OV and a supplementary vision by outputting a supplementary image SI to an eye 100 of a wearer. The spectacle lens is capable of correcting a wearer's ophthalmic vision; it has a back surface BS and a front surface FS where the back surface is positioned closest to the wearer's eye when the spectacle lens is worn; said spectacle lens also comprises a light guide optical element 2 arranged to output a supplementary image SI to the wearer through an exit surface ES of said light guide optical element.

The lens 10 consists of at least two transparent and refringent materials, which may be any organic or mineral material used in the ophthalmic field. The light guide optical element 2 is inserted between the back surface BS and the front surface FS. The light guide optical element 2 has two opposite faces named "proximal surface" PS and "distal surface" DS where the proximal surface is closer to the eye of the wearer than the distal surface when the spectacle lens is worn. Accordingly the proximal surface PS is the surface of the light guide optical element which is the closest from the back surface BS and the distal surface DS the surface of the light guide optical element which is the closest from the front surface FS.

According to an embodiment the proximal surface PS and the distal surface DS are parallel surfaces;

According to another embodiment the proximal surface PS and the distal surface DS are non-parallel surfaces;

According to an embodiment the proximal surface PS and/or the distal surface DS is a (are) plane surface(s);

According to an embodiment the proximal surface PS and/or the distal surface DS is a (are) curved surface(s); such a curved surface is for example a spherical surface, a toric surface, a sphero-toric surface; such a curved surface can also be an aspherized spherical or toric or sphero-toric surface.

A first transparent and refringent material is situated around the light guide optical element 2; the light guide optical element 2 is made of a second transparent and refringent material; the refractive indexes of said two materials may be identical, slightly different or significantly different.

According to the present embodiment, the lens 10 has a convex front surface FS and a concave back surface BS. The surfaces FS and BS have respective curvatures which together determine, with the value(s) of light refractive index(es) of the material(s) between said two surfaces, an optical power of the spectacle lens, for the ophthalmic vision OV.

In the frame of the present invention, this optical power varies between the directions of sight so as to provide a multifocal vision.

The light guide optical element 2 is appropriate for bringing supplementary light from a source 3 which is not represented in detail so as to produce a supplementary image SI. The structure of the light guide optical element 2 is not the subject of this description, and reference can be made to other documents available on this subject. One example of a suitable light optical element is described in patent document WO2005024491 or in patent document WO200195027 in the name of the LUMUS Company. Generally, this invention can apply to any light optical element embedded in the lens providing supplementary image, for which the supplementary image may be distorted or modified by the optical properties of the back surface BS of the lens.

The lens 10 has a front portion 13 which is between the light guide optical element 2 and the front surface FS, and a rear portion 12 which is between the light guide optical element 2 and the back surface BS.

The light guide optical element 2 is limited transversely within an area of the lens 10 in certain directions approximately parallel to the faces FS and BS. In such a configuration, the front portion 13 and the rear portion 12 of the lens 10 extend beyond a peripheral edge 2e of the light guide optical element 2. The lens 10 then has an intermediate portion 11 which extends beyond the edge 2e of the light guide optical element 2 and which continually links the portions 13 and 12 to a peripheral edge E of the lens 10.

The light guide optical element 2 is virtually divided in two zones 2a and 2b separated by a virtual edge 2e'. Zone 2a is the imaging part wherefrom does the supplementary image come from according to the eye of the wearer; zone 2b is a propagation part wherein the supplementary image is propagated from the source 3 without supplying an image to the wearer.

The edge of zone 2a is the contour of the supplementary image output by the light guide optical element; said supplementary image intercepts the proximal surface PS according to an exit surface ES. One names "opposite surface" OS the surface corresponding to the exit surface ES on the distal surface. According to the present example the imaging part is substantially a rectangle whose width is W and whose height is H.

According to a commonly used optical referential, the exit surface ES is defined by an angular aperture contour, denoted $AC(\alpha,\beta)$, $\alpha$ being the eye declination angle and $\beta$ being the eye azimuth angle. $\alpha$, $\beta$ pole is the center of rotation, CRE, of the eye 100 of the wearer behind the lens. 101 corresponds to the axis where $\alpha=\beta=0$.

According to an example, the aperture AC may be +/−15° (degree) either side of an optical axis of the supplementary vision, which passes through the center of the exit surface ES. Said aperture is defined in the azimuthal plane by $|\beta_1|+|\beta_2|$. It is defined in the perpendicular plane by $|\alpha_1|+|\alpha_2|$. In said embodiment, the $\beta$ variation range within $AC(\alpha,\beta)$ is about 30°. In said embodiment, the $\alpha$ variation range within $AC(\alpha,\beta)$ is about 15°.

The generatrix lines of the limit of the angular aperture contour intersect the back surface BS of the lens in an area in which the two visions, ophthalmic and supplementary, are superposed. In the configuration of FIGS. 1a and 1b, the respective optical axes of the ophthalmic vision and of the supplementary vision are one and the same, but they may be distinct.

FIGS. 1a and 1b represent the spectacle lens in the position of use by the wearer. The eye of the wearer 100 is therefore situated behind the lens 10 on the side of the back surface so that it receives, on the one hand, light OV originating from the environment which is situated in front of the lens, and, on the other hand, the light corresponding to the supplementary image SI which is brought by the light guide optical element 2. The light beams of the two lights OV and SI correspond respectively to the ophthalmic vision and to a supplementary vision. They respectively form, after having passed through the pupil 120, an ophthalmic image and a supplementary image on the retina 110 of the wearer. The reference 130 designates the iris of the wearer which surrounds his pupil 120. The direction in which the wearer is looking corresponds to the optical axis of the eye 100. It intersects the surfaces FS and BS of the spectacle lens at respective points which vary when the eye 100 turns in the orbit of the wearer.

Given that the light OV passes through the two surfaces FS and BS of the lens, they both contribute to optical characteristics of the lens which are relative to the ophthalmic vision. However, the light SI does not pass through the surface FS, so that this surface does not contribute to optical characteristics of the lens which are relative to the supplementary vision. Because of this difference between the lights OV and SI, they do not present convergence characteristics which are identical after they have passed through the back surface BS of the lens. For this reason, the ophthalmic and additional images which are formed on the retina may not be simultaneously clear.

The expression "optical characteristics of lens which are relative to one or other of the ophthalmic and supplementary visions" should be understood notably to mean an optical power value, astigmatism values, optical distortion values, etc., of the lens for each direction in which the wearer looks.

Following examples (examples 1 to 9) are given to illustrate embodiments where an ophthalmic spectacle lens capable of correcting the wearer's ophthalmic vision and comprising a light guide optical element arranged to output a supplementary image according to FIGS. 1a and 1b is designed to fulfill the requirements of the present invention.

According to said embodiments the proximal surface PS and the distal surface DS are parallel surfaces.

According to said embodiments the proximal surface PS and the distal surface DS are plane surfaces. According to other possible embodiments, the proximal surface PS and the distal surface DS are curved surfaces.

EXAMPLE 1

Figure 2:
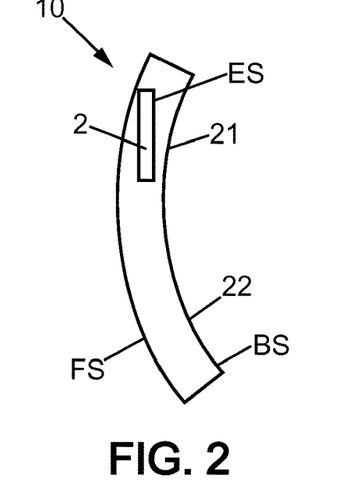
FIGS. 2 to 7 are sketches of embodiments of multifocal ophthalmic spectacle lens according to the present invention.

Progressive Addition Spectacle Lens where the Back Surface BS is a Progressive Surface and where the Angular Aperture Contour $AC(\alpha,\beta)$ is Located in the Far Vision Zone Example 1 is illustrated by FIG. 2.

FIG. 2 is a cut of said lens according to $\beta=0$.

The multifocal ophthalmic spectacle lens 10 is a progressive addition spectacle lens comprising a far vision zone 21, an intermediate vision zone and a near vision zone (in this case: 22) or a progressive addition spectacle lens comprising a far vision zone 21 and an intermediate vision zone (in this case: 22).

The front surface FS is chosen within the list consisting of a spherical surface, a toric surface, a sphero-toric surface. The front surface FS can also be an aspherized spherical or toric or sphero-toric surface.

The back surface BS is a progressive surface.

The angular aperture contour $AC(\alpha,\beta)$ is located in the far vision zone 21.

The inventors have determined that such a zone is both an area of stabilized optical power and an area of stabilized astigmatism.

In said zone, the optical device OD formed by the exit surface ES, the back surface BS and the optical material located between said exit surface ES and said back surface BS fulfills the requirement of equation (E1) when $(\alpha,\beta)$ is within the contour $AC(\alpha,\beta)$:

$$-0.5 \text{ Diopter} \leq P(\alpha,\beta) - P_{mean} \leq 0.5 \text{ Diopter;} \tag{E1}$$

The optical device OD also fulfills the requirement of following equation (E2) when $(\alpha,\beta)$ is within the contour $AC(\alpha,\beta)$:

$$0 \text{ Diopter} \leq \text{UnAsti}(\alpha,\beta) \leq 0.5 \text{ Diopter.} \tag{E2}$$

EXAMPLE 2

Figure 3:
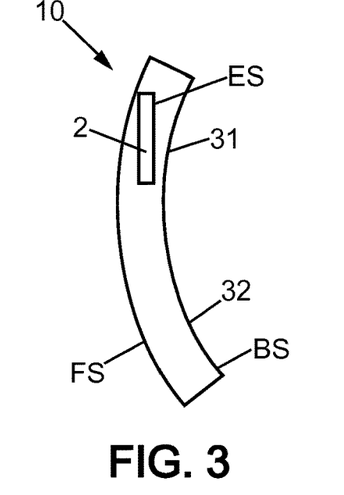

Progressive Addition Spectacle Lens where the Back Surface BS is a Progressive Surface or a Regressive Surface and where the Angular Aperture Contour $AC(\alpha,\beta)$ is Located in the Far Vision Zone Example 2 is illustrated by FIG. 3.

FIG. 3 is a cut of said lens according to $\beta=0$.

The multifocal ophthalmic spectacle lens 10 is a progressive addition spectacle lens comprising a far vision zone 21, an intermediate vision zone and a near vision zone or a progressive addition spectacle lens comprising a far vision zone 21 and an intermediate vision zone.

The front surface FS is chosen within the list consisting of a regressive surface and a progressive surface.

The back surface BS is a progressive surface or a regressive surface.

The angular aperture contour $AC(\alpha,\beta)$ is located in the far vision zone 21.

The inventors have determined that such a zone is both an area of stabilized optical power and an area of stabilized astigmatism.

In said zone, the optical device OD formed by the exit surface ES, the back surface BS and the optical material located between said exit surface ES and said back surface BS fulfills the requirement of equation (E1) when $(\alpha,\beta)$ is within the contour $AC(\alpha,\beta)$:

$$-0.5 \text{ Diopter} \leq P(\alpha,\beta) - P_{mean} \leq 0.5 \text{ Diopter;} \tag{E1}$$

The optical device OD also fulfills the requirement of following equation (E2) when $(\alpha,\beta)$ is within the contour $AC(\alpha,\beta)$:

$$0 \text{ Diopter} \leq \text{UnAsti}(\alpha,\beta) \leq 0.5 \text{ Diopter.} \tag{E2}$$

EXAMPLE 3

Progressive Addition Spectacle Lens where the Back Surface BS is a Progressive Surface or a Regressive Surface and where the Angular Aperture Contour $AC(\alpha,\beta)$ is Located in the Near Vision Zone Example 3 is not represented.

The multifocal ophthalmic spectacle lens 10 is a progressive addition spectacle lens comprising a far vision zone, an intermediate vision zone and a near vision zone or a progressive addition spectacle lens comprising an intermediate vision zone and a near vision zone.

The back surface BS is a progressive surface or a regressive surface.

The front surface FS can be chosen within the list consisting of a spherical surface, a toric surface, a sphero-toric surface. The front surface FS can also be an aspherized spherical or toric or sphero-toric surface.

The front surface FS can also be chosen within the list consisting of a regressive surface and a progressive surface.

The angular aperture contour $AC(\alpha,\beta)$ is located in the near vision zone.

The inventors have determined that such a zone is both an area of stabilized optical power and an area of stabilized astigmatism.

In said zone, the optical device OD formed by the exit surface ES, the back surface BS and the optical material located between said exit surface ES and said back surface BS fulfills the requirement of equation (E1) when $(\alpha,\beta)$ is within the contour $AC(\alpha,\beta)$:

$$-0.5 \text{ Diopter} \leq P(\alpha,\beta) - P_{mean} \leq 0.5 \text{ Diopter;} \tag{E1}$$

The optical device OD also fulfills the requirement of following equation (E2) when $(\alpha,\beta)$ is within the contour $AC(\alpha,\beta)$:

$$0 \text{ Diopter} \leq \text{UnAsti}(\alpha,\beta) \leq 0.5 \text{ Diopter.} \tag{E2}$$

EXAMPLE 4

Figure 4A:
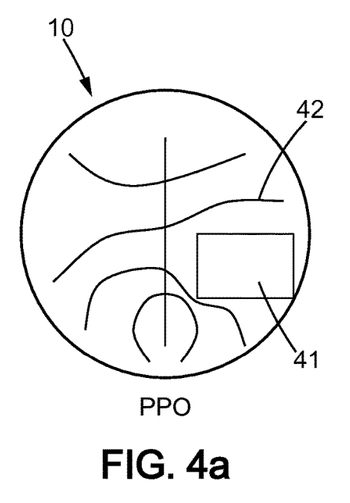
Figure 4B:
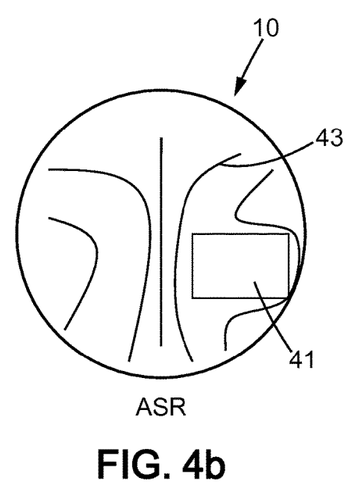

Progressive Addition Spectacle Lens where the Back Surface BS is a Progressive Surface or a Regressive Surface and where the Angular Aperture Contour $AC(\alpha,\beta)$ is Located in a Zone where αMeets the Intermediate Vision Zone Example 4 is illustrated by FIGS. 4a and 4b.

The multifocal ophthalmic spectacle lens 10 is a progressive addition spectacle lens chosen within the list consisting of a spectacle lens comprising a far vision zone, an intermediate vision zone and a near vision zone; a spectacle lens comprising an intermediate vision zone and a near vision zone; a spectacle lens comprising a far vision zone and an intermediate vision zone.

The back surface BS is a progressive surface or a regressive surface.

FIG. 4a is a schematic view of the back surface BS that represents iso sphere curves 42 of said back surface BS. The sphere value difference between two neighbouring iso sphere curves is 0.5 Diopter.

FIG. 4b is a schematic view of the back surface BS that represents iso astigmatism curves 43 of said back surface BS. The astigmatism difference between two neighbouring iso astigmatism curves is 0.5 Diopter.

The front surface FS can be chosen within the list consisting of a spherical surface, a toric surface, a sphero-toric surface. The front surface FS can also be an aspherized spherical or toric or sphero-toric surface.

The front surface FS can also be chosen within the list consisting of a regressive surface and a progressive surface.

The angular aperture contour AC($\alpha,\beta$) is located in the temporal zone or in the nasal zone of the spectacle lens, in a zone where a meets the intermediate vision zone.

The inventors have determined that such a zone 41 may be both an area of stabilized optical power and an area of stabilized astigmatism.

In said zone, the optical device OD formed by the exit surface ES, the back surface BS and the optical material located between said exit surface ES and said back surface BS fulfills the requirement of equation (E1) when ($\alpha,\beta$) is within the contour AC($\alpha,\beta$):

$$-0.5 \text{ Diopter} \leq P(\alpha,\beta) - P_{mean} \leq 0.5 \text{ Diopter};\quad (E1)$$

The optical device OD also fulfills the requirement of following equation (E2) when ($\alpha,\beta$) is within the contour AC($\alpha,\beta$):

$$0 \text{ Diopter} \leq \text{UnAsti}(\alpha,\beta) \leq 0.5 \text{ Diopter}.\quad (E2)$$

EXAMPLE 5

Progressive Addition Spectacle Lens where the Back Surface BS is a Progressive Surface or a Regressive Surface Comprising a Surface Discontinuity Located Around the Angular Aperture Contour AC($\alpha,\beta$)

Figure 5:
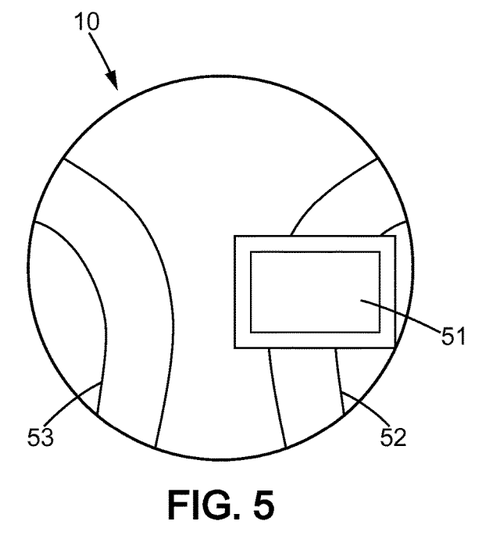

Example 5 is illustrated by FIG. 5.

The multifocal ophthalmic spectacle lens 10 is a progressive addition spectacle lens chosen within the list consisting of a spectacle lens comprising a far vision zone, an intermediate vision zone and a near vision zone; a spectacle lens comprising an intermediate vision zone and a near vision zone; a spectacle lens comprising a far vision zone and an intermediate vision zone.

FIG. 5 is a schematic view of the back surface BS that represents iso astigmatism curves 53 of said back surface BS. The astigmatism difference between two neighbouring iso astigmatism curves is 0.5 Diopter.

Zone 52 is a surface discontinuity located around the angular aperture contour AC($\alpha,\beta$) 51. According to said embodiment, the surface within zone 52 is a sphero-toric surface where the surface is a progressive or a regressive surface out of zone 52.

Said zone 51 is designed so as the optical device OD formed by the exit surface ES, the back surface BS and the optical material located between said exit surface ES and said back surface BS fulfills the requirement of equation (E1) when ($\alpha,\beta$) is within the contour AC($\alpha,\beta$):

$$-0.5 \text{ Diopter} \leq P(\alpha,\beta) - P_{mean} \leq 0.5 \text{ Diopter};\quad (E1)$$

The optical device OD can also fulfill the requirement of following equation (E2) when ($\alpha,\beta$) is within the contour AC($\alpha,\beta$):

$$0 \text{ Diopter} \leq \text{UnAsti}(\alpha,\beta) \leq 0.5 \text{ Diopter}.\quad (E2)$$

Such a surface discontinuity in zone 51 may be obtained when designing the back surface BS of the progressive addition spectacle lens; it can also be obtained by machining the back surface BS of a progressive addition spectacle lens.

EXAMPLE 6

Figure 6:
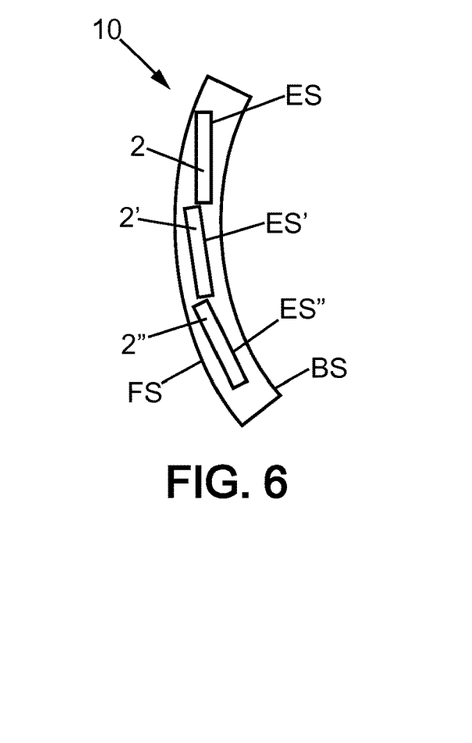

Progressive Addition Spectacle Lens where the Front Surface FS is a Progressive Surface and the Back Surface BS is a Surface where the Absolute Values of the Mean Sphere Value Differences Over Said Surface are Equal or Less to 0.5 Diopter Example 6 is illustrated by FIG. 6.

FIG. 6 is a cut of said lens according to $\beta=0$.

The multifocal ophthalmic spectacle lens 10 is a progressive addition spectacle lens chosen within the list consisting of a spectacle lens comprising a far vision zone, an intermediate vision zone and a near vision zone; a spectacle lens comprising an intermediate vision zone and a near vision zone; a spectacle lens comprising a far vision zone and an intermediate vision zone.

The back surface BS can be chosen within the list consisting of a spherical surface, a toric surface, a spherotoric surface. Accordingly, the absolute values of the mean sphere value differences over said whole back surface are equal or less to 0.5 Diopter.

The back surface BS can also be an aspherized spherical or toric or sphero-toric surface where the absolute values of the mean sphere value differences over said surface are equal or less to 0.5 Diopter all over said back surface.

The back surface BS can also be chosen within the list consisting of a regressive surface and a progressive surface where the dioptric add power is equal or less to 0.5 Diopter.

The inventors have determined that such a back surface BS is an area of stabilized optical power suitable to form an optical device OD with an exit surface ES.

All over said back surface BS, the optical device OD formed by the exit surface ES, the back surface BS and the optical material located between said exit surface ES and said back surface BS fulfills the requirement of equation (E1) when ($\alpha,\beta$) is within the contour AC($\alpha,\beta$):

$$-0.5 \text{ Diopter} \leq P(\alpha,\beta) - P_{mean} \leq 0.5 \text{ Diopter};\quad (E1)$$

The optical device OD can also fulfill the requirement of following equation (E2) when ($\alpha,\beta$) is within the contour AC($\alpha,\beta$):

$$0 \text{ Diopter} \leq \text{UnAsti}(\alpha,\beta) \leq 0.5 \text{ Diopter}.\quad (E2)$$

Accordingly, the exit surface can be placed in several zones of the back surface BS, such as illustrated as ES, ES', ES" when one or several of light guide optical element 2, 2', 2" are inserted within the front surface FS and the back surface BS.

According to different or combined examples, ES is located in a far vision zone, ES' is located in an intermediate vision zone, ES" is located in a near vision zone.

EXAMPLE 7

Figure 7:
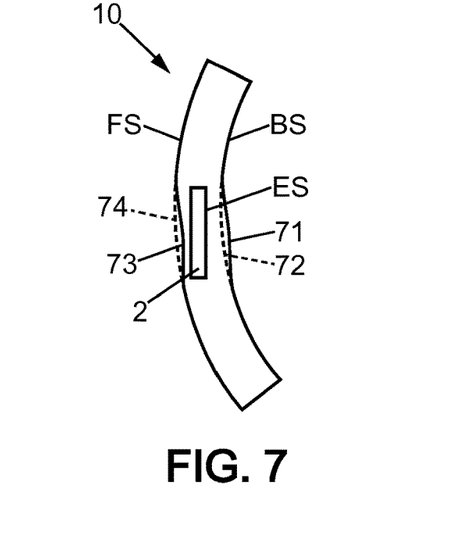

Progressive Addition Spectacle Lens where the Back Surface BS is a Progressive Surface or a Regressive Surface, and where the Angular Aperture Contour, AC($\alpha,\beta$), is Located in a Part of the Intermediate Vision Zone where the Absolute Value of the Mean Sphere Value Differences Over Said Part of the Intermediate Vision Zone are Equal or Less to 0.5 Diopter Example 7 is illustrated by FIG. 7.

FIG. 7 is a cut of said lens according to $\beta=0$.

The multifocal ophthalmic spectacle lens 10 is a progressive addition spectacle lens chosen within the list consisting of a spectacle lens comprising a far vision zone, an intermediate vision zone and a near vision zone; a spectacle lens comprising an intermediate vision zone and a near vision zone; a spectacle lens comprising a far vision zone and an intermediate vision zone.

The front surface FS can be chosen within the list consisting of a spherical surface, a toric surface, a sphero-toric surface. The front surface FS can also be an aspherized spherical or toric or sphero-toric surface.

The front surface FS can also be chosen within the list consisting of a regressive surface and a progressive surface.

The back surface BS is a progressive surface or a regressive surface. The angular aperture contour, $AC(\alpha,\beta)$, is located in a part of the intermediate vision zone where the absolute value of the mean sphere value differences over said part of the intermediate vision zone are equal or less to 0.5 Diopter.

Such a result can be obtained when designing the back surface BS and the front surface FS of the progressive addition spectacle lens.

According to an embodiment designing the back surface BS and the front surface FS uses firstly an initial back surface BS which is a progressive surface or a regressive surface with a standard design 72 (dotted line) in the intermediate vision zone and also all over the back surface; the combination of the initial back surface BS and of an initial front surface FS defines an initial optical system of an initial progressive lens. The initial design of the initial back surface BS is modified and a final progressive surface or regressive surface 71 in the intermediate vision zone is calculated which is a complex surface. Said complex surface calculated so that the optical device OD formed by the exit surface ES, the final back surface BS and the optical material located between said exit surface ES and said final back surface BS fulfills the requirement of equation (E1) when $(\alpha,\beta)$ is within the contour $AC(\alpha,\beta)$:

$$-0.5 \text{ Diopter} \leq P(\alpha,\beta)-P_{mean} \leq 0.5 \text{ Diopter;} \quad (E1):$$

The optical device OD can also fulfill the requirement of following equation (E2) when $(\alpha,\beta)$ is within the contour $AC(\alpha,\beta)$:

$$0 \text{ Diopter} \leq \text{UnAsti}(\alpha,\beta) \leq 0.5 \text{ Diopter.} \quad (E2):$$

The initial front surface in the intermediate vision zone 74 (dotted line) is then modified and a final front surface in the intermediate vision zone 73 is calculated so that the final optical system, which is the combination of the final back surface BS and of the final front surface FS, defines a final optical system of the progressive lens which is substantially identical to the optical system of the initial progressive lens.

Here above examples demonstrate that the present invention is advantageous in the case of a progressive lens, for example when the rear surface presents power and or astigmatism variations.

One example of such lens is a "Full Back Side" progressive lens where the front surface is a spherical surface and the rear surface is a progressive surface. In this case the rear surface presents power and astigmatism variations. If these variations occur on the optical path of the supplementary image, they will cause aberrations and lead to a blurry supplementary image. In order to provide a supplementary image with good acuity to the wearer, it is useful to design the lens according to the present invention so that the power variations and the astigmatism variations are limited within the contour $AC(\alpha,\beta)$.

Another example is a "Dual Side" progressive lens where both the front surface and the rear surface are progressive surfaces. In this case also, the rear surface presents power and astigmatism variations. The same preceding argument applies.

EXAMPLE 8

Bifocal Ophthalmic Spectacle Lens

Example 8 is not represented.

According to said example, the multifocal ophthalmic spectacle lens is a bifocal lens wherein the optical device OD comprises an area of stabilized optical power and where the angular aperture contour $AC(\alpha,\beta)$ is situated in the area of stabilized optical power so that the optical device (OD) fulfils the requirement of following equation (E1) when $(\alpha,\beta)$ is within the contour $AC(\alpha,\beta)$:

$$-0.5 \text{ Diopter} \leq P(\alpha,\beta)-P_{mean} \leq 0.5 \text{ Diopter;} \quad (E1):$$

According to a further embodiment, the multifocal ophthalmic spectacle lens is a bifocal lens wherein the optical device OD also comprises an area of stabilized astigmatism and where the angular aperture contour $AC(\alpha,\beta)$ is situated in the area of stabilized astigmatism so that the optical device (OD) fulfils the requirement of following equation (E2) when $(\alpha,\beta)$ is within the contour $AC(\alpha,\beta)$:

$$0 \text{ Diopter} \leq \text{UnAsti}(\alpha,\beta) \leq 0.5 \text{ Diopter.} \quad (E2):$$

EXAMPLE 9

Trifocal Ophthalmic Spectacle Lens

Example 9 is not represented.

According to said example, the multifocal ophthalmic spectacle lens is a trifocal lens wherein the optical device OD comprises an area of stabilized optical power and where the angular aperture contour $AC(\alpha,\beta)$ is situated in the area of stabilized optical power so that the optical device (OD) fulfils the requirement of following equation (E1) when $(\alpha,\beta)$ is within the contour $AC(\alpha,\beta)$:

$$-0.5 \text{ Diopter} \leq P(\alpha,\beta)-P_{mean} \leq 0.5 \text{ Diopter;} \quad (E1):$$

According to a further embodiment, the multifocal ophthalmic spectacle lens is a trifocal lens wherein the optical device OD also comprises an area of stabilized astigmatism and where the angular aperture contour $AC(\alpha,\beta)$ is situated in the area of stabilized astigmatism so that the optical device (OD) fulfils the requirement of following equation (E2) when $(\alpha,\beta)$ is within the contour $AC(\alpha,\beta)$:

$$0 \text{ Diopter} \leq \text{UnAsti}(\alpha,\beta) \leq 0.5 \text{ Diopter.} \quad (E2):$$

The invention has been described above with the aid of embodiments without limitation of the general inventive concept; in particular the parameters are not limited to the examples discussed.

The invention claimed is:

1. A multifocal ophthalmic spectacle lens to correct a wearer's ophthalmic vision and comprising:
   a back surface and a front surface, where the back surface is positioned closest to a wearer's eye when the multifocal ophthalmic spectacle lens is worn,
   a light guide optical element arranged to output a supplementary image to the wearer through an exit surface of said light guide optical element, where the exit surface, the back surface, and
   an optical material located between said exit surface and said back surface form an optical device, wherein said optical device comprises an area of stabilized optical power; and wherein the exit surface is defined by an angular aperture contour, denoted AC($\alpha,\beta$), $\alpha$ being the eye declination angle and $\beta$ being the eye azimuth angle, wherein the angular aperture contour, AC($\alpha,\beta$), is situated in the area of stabilized optical power where the optical device fulfils the requirement of following equation (E1) when ($\alpha,\beta$) is within the contour AC($\alpha,\beta$):

$$-0.5 \text{ Diopter} \leq P(\alpha,\beta) - P_{mean} \leq 0.5 \text{ Diopter;} \quad \text{(E1)}$$

where $P(\alpha,\beta)$ is the dioptric power of the optical device and $P_{mean}$ is the mean dioptric power of the optical device within the contour AC($\alpha,\beta$), wherein $P(\alpha,\beta)$ and $P_{mean}$ are expressed in Diopter.

2. The multifocal ophthalmic spectacle lens as claimed in claim 1, according to which the $\alpha$ variation range within AC($\alpha,\beta$) and the $\beta$ variation range within AC($\alpha,\beta$) are each equal or greater to 5°.

3. The multifocal ophthalmic spectacle lens as claimed in claim 1, according to which the optical device is located in an area of stabilized astigmatism, wherein the exit surface is defined by an angular aperture contour, denoted AC($\alpha,\beta$), $\alpha$ being the eye declination angle and $\beta$ being the eye azimuth angle, wherein the angular aperture contour, AC ($\alpha,\beta$) is situated in the area of stabilized astigmatism so that the optical device fulfils the requirement of following equation (E2) when ($\alpha,\beta$) is within the contour AC($\alpha,\beta$):

$$0 \text{ Diopter} \leq \text{UnAsti}(\alpha,\beta) \leq 0.5 \text{ Diopter;} \quad \text{(E2)}$$

where UnAsti($\alpha,\beta$) is the unwanted astigmatism value of the optical device and wherein UnAsti is expressed in Diopter.

4. The multifocal ophthalmic spectacle lens as claimed in claim 1, according to which the area of stabilized optical power results from the optical power generated by the geometry of the back surface.

5. The multifocal ophthalmic spectacle lens as claimed in claim 1, according to which the multifocal ophthalmic spectacle lens is a progressive addition spectacle lens chosen within the list consisting of a spectacle lens comprising a far vision zone, an intermediate vision zone and a near vision zone; a spectacle lens comprising an intermediate vision zone and a near vision zone; a spectacle lens comprising a far vision zone and an intermediate vision zone.

6. The multifocal ophthalmic spectacle lens as claimed in claim 5, according to which the multifocal ophthalmic spectacle lens is a spectacle lens comprising a far vision zone, an intermediate vision zone and a near vision zone or a spectacle lens comprising, a far vision zone and an intermediate vision zone, where the back surface is a progressive surface or a regressive surface and where the angular aperture contour, AC($\alpha,\beta$), is located in the far vision zone.

7. The multifocal ophthalmic spectacle lens as claimed in claim 5, according to which the multifocal ophthalmic spectacle lens is a spectacle lens comprising a far vision zone, an intermediate vision zone and a near vision zone or a spectacle lens comprising an intermediate vision zone and a near vision zone, where the back surface is a progressive surface or a regressive surface, and where the angular aperture contour, AC($\alpha,\beta$), is located in the near vision zone.

8. The multifocal ophthalmic spectacle lens as claimed in claim 5, according to which the back surface is a progressive surface or a regressive surface, and where the angular aperture contour, AC($\alpha,\beta$), is located in the temporal zone or in the nasal zone of the spectacle lens, in a zone where a meets the intermediate vision zone.

9. The multifocal ophthalmic spectacle lens as claimed in claim 5, according to which the front surface is a progressive surface and the back surface is a surface where the absolute value of the mean sphere value differences over said surface are equal to or less than 0.5 Diopter.

10. The multifocal ophthalmic spectacle lens as claimed in claim 5, according to which the back surface is a progressive surface or a regressive surface, and where the angular aperture contour, AC($\alpha,\beta$), is located in a part of the intermediate vision zone where the absolute values of the mean sphere value differences over said part of the intermediate vision zone are equal to or less than 0.5 Diopter.

11. The multifocal ophthalmic spectacle lens as claimed in claim 5, according to which the back surface is a progressive surface and comprising a surface discontinuity located around the angular aperture contour, AC($\alpha,\beta$).

12. The multifocal ophthalmic spectacle lens as claimed in claim 1, according to which the multifocal ophthalmic spectacle lens is chosen within the list consisting of bifocal lens and trifocal lens.

13. A method for calculating with a computer a multifocal ophthalmic spectacle lens to correct wearer's vision, the method comprising:

providing the multifocal ophthalmic spectacle lens having a back surface and a front surface where the back surface is positioned closest to a wearer's eye when the multifocal ophthalmic spectacle lens is worn, the multifocal ophthalmic spectacle lens comprising a light guide optical element arranged to output a supplementary image to the wearer through an exit surface of said light guide optical element, where the exit surface, the back surface and an optical material located between said exit surface and said back surface form an optical device so that said optical device is located in an area of stabilized optical power, and calculating the geometry of the back surface and the geometry of the front surface using an optimization method involving a target lens that has a virtual optical function according to a wearer's prescription, wherein the exit surface is defined by an angular aperture contour, denoted AC($\alpha,\beta$), $\alpha$ being the eye declination angle and $\beta$ being the eye azimuth angle, and wherein the angular aperture contour, AC($\alpha,\beta$), is situated in the area of stabilized optical power where the optical device fulfils the requirement of following equation (E1) when ($\alpha,\beta$) is within the contour AC($\alpha,\beta$):

$$-0.5 \text{ Diopter} \leq P(\alpha,\beta) - P_{mean} \leq 0.5 \text{ Diopter;} \quad \text{(E1):}$$

where $P(\alpha,\beta)$ is the dioptric power of the optical device and $P_{mean}$ is the mean dioptric power of the optical device within the contour AC($\alpha,\beta$), wherein $P(\alpha,\beta)$ and $P_{mean}$ are expressed in Diopter.

* * * * *